(12) United States Patent
Lomask

(10) Patent No.: US 7,233,333 B2
(45) Date of Patent: Jun. 19, 2007

(54) COLLAPSIBLE (FOLDING) GRAPH

(75) Inventor: Joseph Lomask, Wilmington, NC (US)

(73) Assignee: Buxco Electric, Inc., Sharon, CT (US)

( * ) Notice: Subject to any disclaimer, the term of this patent is extended or adjusted under 35 U.S.C. 154(b) by 132 days.

(21) Appl. No.: 10/995,584

(22) Filed: Nov. 23, 2004

(65) Prior Publication Data

US 2006/0109271 A1 May 25, 2006

(51) Int. Cl.
*G06T 11/20* (2006.01)

(52) U.S. Cl. .................................................. 345/440

(58) Field of Classification Search ................. 345/440
See application file for complete search history.

(56) References Cited

U.S. PATENT DOCUMENTS

| | | | |
|---|---|---|---|
| 4,884,440 A | | 12/1989 | Berthel |
| 5,151,998 A | | 9/1992 | Chappell |
| 5,485,564 A | | 1/1996 | Miura |
| 5,491,781 A | * | 2/1996 | Gasperina ................... 715/786 |
| 5,619,631 A | * | 4/1997 | Schott ......................... 345/440 |
| 5,634,128 A | * | 5/1997 | Messina ...................... 719/316 |
| 6,423,013 B1 | | 7/2002 | Bakker et al. |
| 6,647,280 B2 | | 11/2003 | Bahr et al. |
| 2002/0067358 A1 | | 6/2002 | Casari et al. |

OTHER PUBLICATIONS

Simon, "Excel 2000 in a Nutshell", 2000, O'Reilly & Associates, Inc. chpt 10.*

Adobe Audition, 2003, Adobe Systems Inc. pp. 301-314.*

* cited by examiner

*Primary Examiner*—Kee M. Tung
*Assistant Examiner*—Michelle K. Lay
(74) *Attorney, Agent, or Firm*—MacCord Mason PLLC

(57) ABSTRACT

Generally, the present invention is directed towards a system and method for displaying a scientific research data set viewable on an electronic display. The system is made up of a computerized device having an electronic display for displaying a selectable range of data points, an input device for receiving user input, and a digital processor for processing data and a memory for storing computer instructions and data. A set of graphical user interface instructions executable by the digital processor is stored within the memory to realize the method. The method includes steps of generating at least one data graphing area on the electronic display; graphing within the at least one data graphing area at least one line graph of data points representing at least a portion of the graphical data set; generating at least one graphical interface control for selectively rendering or removing from view a selectable range of the at least one line graph of data points; receiving input by way of the at least one graphical user interface control values indicative of the selectable range to render or remove and an indication of whether or not to render or remove from view the selectable range; and dynamically rendering or removing from view the selectable range of the at least one line graph of data points.

21 Claims, 3 Drawing Sheets

COLLAPSIBLE (FOLDING) GRAPH

FIELD OF THE INVENTION

The present invention is directed towards displaying a graph of a numerical data set contaminated with non-relevant data known as noise. In particular, the present invention is directed towards a method and system for allowing a user to select and omit non-relevant data from a graph representing the numerical data set.

DESCRIPTION OF THE PRIOR ART

In medical and other scientific research, scientists collect large volumes of data. Although a lot of this data is archived for research, the scientists actually use only a small portion of the data for their study results. Scientists define the way they select their data in a study "protocol".

In general terms, computers can automate some protocols but not all. Those that cannot be automated by computer require a researcher to visually identify the data of interest by reviewing the data both in graph and table form. Once the data of interest has been identified, the researcher typically manually selects the data they want to include in their results.

Even in those protocols that can be automated by computer, data collected from animal based medical research is often contaminated with non-relevant data such as noise and artifacts. All noise and artifacts should be excluded from the data being studied. For example, in medical research some studies are performed on conscious animals that perform activities that contaminant a data set. For instance, conscious animals may do things such as groom themselves. Acts such as this create data points that should be ignored. Some non-relevant data can be rejected at the time of data collection, using computer algorithms, but most non-relevant data rejection algorithms are flawed. Thus, ultimately a person trained to perform data screening can improve the effectiveness of rejecting non-relevant data from a research study data set. A data rejection process used by the data screener or researcher typically involves inspection of the research study data set in graphical and tabular form to identify data regions that possibly contain non-relevant data due to noise and/or artifacts.

Prior to the widespread use of computers, researchers would collect data on paper strip chart recorders, which would produce yards of printouts. Then, they would hand-mark regions on the printouts as "data of interest", in a sort of mechanical filtering. When reading the marked up printouts they would often fold over sections of non-relevant data, so only to show the data of interest.

Now that computers are widespread, a great advantage over chart recorders can be realized, yet the techniques developed for screening and rejecting non-relevant data need not be lost. What is needed is a method and system that empowers a researcher with the ability to view data over time in a combined graphical and tabular form while tapping the tremendous power offered by modern digital computers. Tables are necessary for seeing the data up close and on a microscopic level and graphs give a macroscopic view. Both should work together to allow the researcher to define regions of study data, and to reject non-relevant data due to noise and artifacts. Once regions are identified, researchers should be able to "collapse" any non-relevant regions of data, so that they can view only the data of interest.

SUMMARY OF THE INVENTION

The present invention relates to a system and method for displaying only relevant research data in a graphical form on an electronic display. In particular, the present invention provides a system and method for removing non-relevant data from the display.

Generally, the present invention provides a system and method that displays on an electronic display one or more graphs of a numerical data set. For the purposes of this disclosure, a graph area is a single graph in which data points can be plotted. Also, whenever the plotted data points are connected by line segments, the combined plotted data points and line segments are referred to as a trace. More than one graph area can be displayed at a time. While each graph area has its own vertical axis and independent scale if desired, it is preferred that only one horizontal axis, usually a time axis, be displayed for all graph areas concurrently displayed.

Each graph area has a graphical user interface control referred to as a graphical user interface (GUI) button. By activating the GUI button using a computer input device such as computer mouse, the user can display or remove from view the associated graph area.

A section is defined as a portion of the graph, which is a continuous segment versus a parameter such as time. A section can be subdivided into regions. A region is a portion of a section that a user can selectively display or remove from view by activating the GUI button using a computer input device. Also for the purposes of this disclosure, the removal of a section or region from view is analogous to collapsing or folding regions and sections of a paper strip chart. The terms collapse and fold used within this disclosure mean to remove from view a section or region of a section of a graph presented on an electronic display. Each region may be selected individually or an entire section containing a plurality of regions can be collapsed all at once.

In particular, the present invention includes a system for graphing a selectable range of the set of data points. The system is made up of a computerized device having an electronic display for displaying the selectable range of data points, an input device for receiving user input, and a digital processor for processing data and a memory for storing computer instructions and data. A set of graphical user interface instructions executable by the digital processor is stored within the memory to direct said computer to:

i) generate at least one data graphing area on the electronic display;

ii) graph within the at least one data graphing area at least one selectable range of data points representing at least a portion of the scientific research data set;

iii) generate at least one graphical user interface control for selectively rendering or removing from view the at least one selectable range of data points;

iv) receive input by way of the at least one graphical user interface control the at least one selectable range of the plurality of data points along with an indicator of whether or not to render or remove from view the at least one selectable range of data points; and v) render or remove from view a selected range of the at least one selectable range of data points in response to the input received by way of the at least one graphical user interface control.

Moreover, the method of the present invention includes steps for generating at least one data graphing area on the electronic display; plotting within the at least one data graphing area a plurality of data points representing at least a portion of the graphical data set; generating at least one graphical interface control for selectively rendering or removing from view a selectable range of the plurality of data points; receiving input by way of the at least one graphical user interface control the selectable range of the plurality of data points to render or remove along with a logical value indicative of whether or not to render or remove from view the selectable range of the plurality of data points; and dynamically rendering or removing from view the plurality of data points indicated.

The present invention also provides a graphical user interface for managing the display of the scientific research data set. The graphical user interface is made up of:

a) a graph control object for generating at least one data graphing area on the electronic display;

b) a section object for generating a section within the at least one data graphing area;

c) a region object for generating a region within the section object;

d) a data plotting object for plotting data points within the sections and regions of the at least one graphing area, the data points being from the scientific research data set;

e) a vertical axis object for generating a vertical axis scaled appropriately for the scientific research data;

f) a span object for storing information about the horizontal span of data points plotting by the data plotting object; and g) a horizontal axis object for generating a horizontal axis scaled according to the information stored by the span object.

In operation, the user will select the non-relevant data for removal by way of the at least one graphical user interface (GUI) control. Preferably, the at least one GUI control is a GUI button selectable using a computer input device such as a computer mouse, keyboard, touch-screen or light pen.

Preferably, there is a GUI control for every graph item such as every section of each graph, every region of each graph as well as each graph as a whole. Each GUI control has a logical value for determining whether or not an associated graph item is rendered displayed or removed from view. In the case of the preferred GUI button, the logical value changes state responsive to a user input. For example, the logical value of the GUI button will change state when a cursor representing a mouse position is placed over the GUI button and a switch within a computer mouse in control of the cursor is activated by a user action commonly referred to as a mouse click. As long as the mouse cursor is on the GUI button and the user performs a mouse click, the logical value will change state, alternately displaying and removing (e.g. collapsing) from display the graphic item controlled by the GUI button.

It is also preferable for a region GUI button to have a user adjustable length placed adjacent to and directly above the graph area. In this way, all data plotted directly under the adjustable button length is associated with the button. Therefore, the length of the button is proportional to the range of data selected. In other words, the longer the button, the greater the range is of the data selected and vice versa. A click and drag type mouse operation is used to stretch the length of the region GUI button. Thereby, extending a region to include more data points. Likewise, a click and drag mouse operation is used to reduce the length of the region GUI button. Thereby, reducing the number of data points within a region.

These and other aspects of the invention will become apparent to those skilled in the art after a reading of the following description of the preferred embodiment.

BRIEF DESCRIPTION OF THE DRAWINGS

In the following drawings, like reference characters in the same or different figures indicate like items.

DETAILED DESCRIPTION OF THE INVENTION

Figure 1:
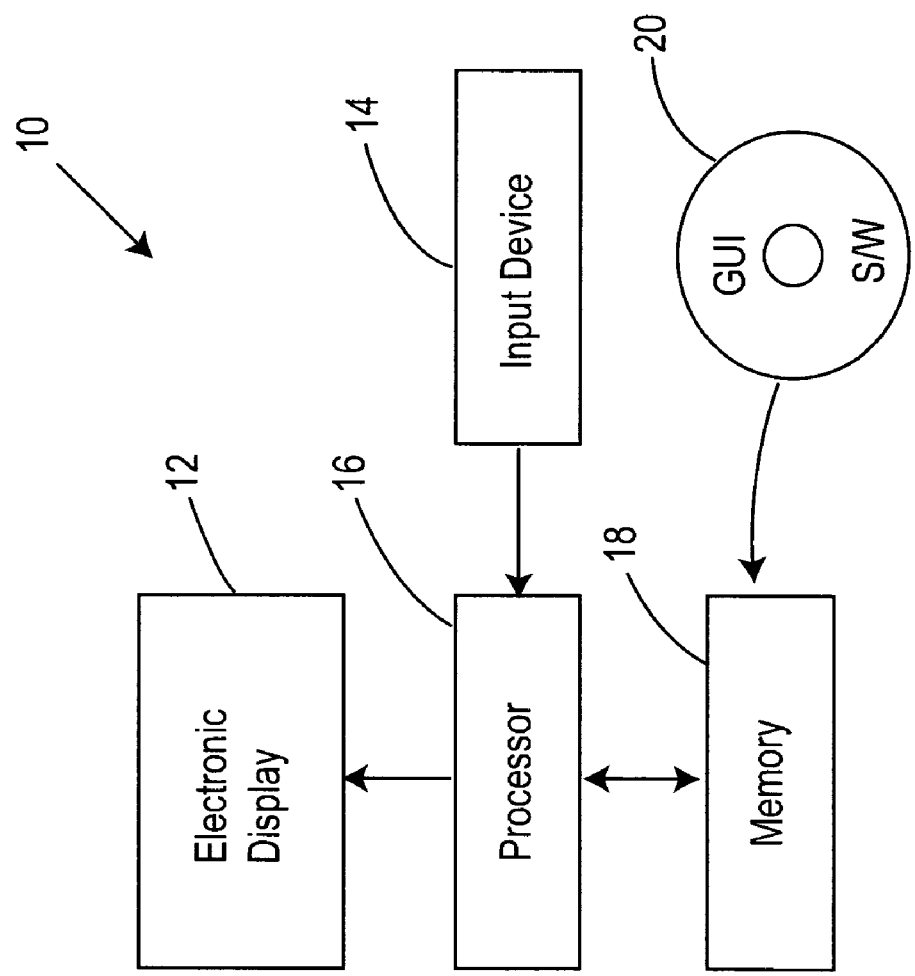
FIG. 1 is a diagram showing the system components of the present invention.

FIG. 1 depicts a system 10 for graphing a selectable range of the set of data points. The system is made up of a computerized device having an electronic display 12 for displaying the selectable range of data points, an input device 14 for receiving user input, and a digital processor 16 for processing data and a memory 18 for storing computer instructions and data. A set of graphical user interface instructions stored on software media 20 executable by digital processor 16 is stored within the memory 18.

In the preferred embodiment, the method of the present invention is realized with object based or object oriented software. The overall graph control is constructed using a set of software objects or classes that define properties and behaviors of each graph presented on the electronic display.

Figure 2:
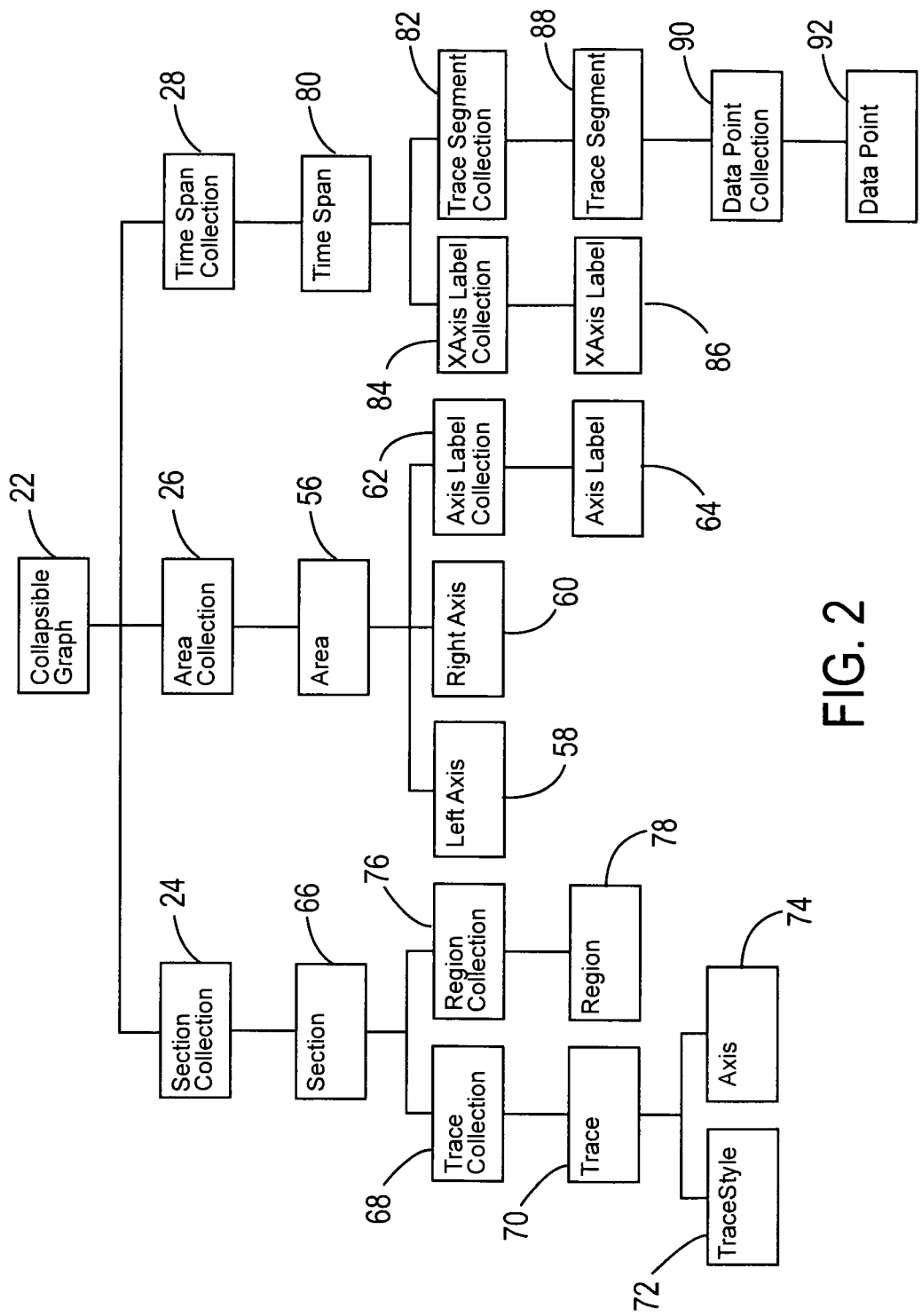
FIG. 2 is a block diagram showing the major software objects of the present invention.

FIG. 2 illustrates the major software objects and their relationships. Graph control object 22 is the main control for the present invention. It contains properties and methods that are associated with the control as a whole. It contains two public object collections 24 and 26 as well as one internal object collection 28.

Graph control object 22 has the following properties:

Title

Figure 3:
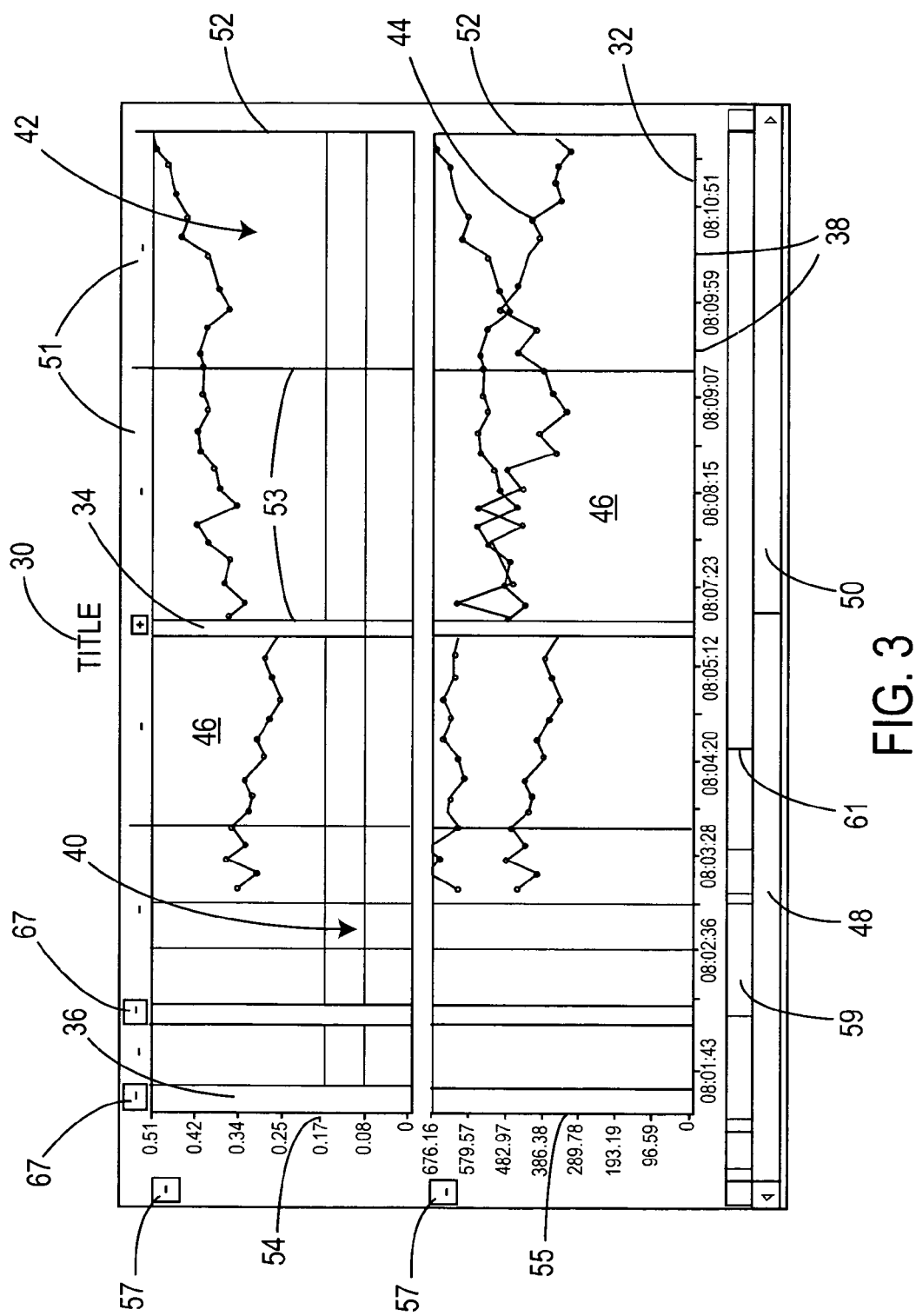
FIG. 3 is a depiction of a graphic display according to the present invention.

As shown in FIG. 3, the Title property is a user definable text 30 description that appears above a graph. Preferably, the user can select the font, size and color of the text.

VisibleDuration

The VisibleDuration property represents the user defined time scale to show across a horizontal axis 32 of one or more graphs. However, since a collapsed region 34 or collapsed section 36 occupies some display space, the user defined time scale sometimes will be slightly adjusted by the software in order to be realisable.

Divisions

The Divisions property assigns a number of tick mark divisions 38 to show across horizontal axis 32. As depicted in FIG. 3, horizontal axis 32 is a time axis. In other embodiments, horizontal axis 32 could just as well be related to some other parameter other than time.

Show Grid

A grid 40 is a plurality of horizontal and vertical lines that overlay a graph area 42. Typically, horizontal grid lines represent a scale of magnitude for the graphed data, whereas vertical grid lines typically represent units of time. The show grid property is a logical value that is set by the user to either show or not show a grid over a selected graph. If the show grid property's logical value is set true, then a grid is shown otherwise no grid is shown.

Relative Time

The relative time property is a logical value for a selected section that when set true, forces the time on horizontal axis 32 to be presented relative to a trace 44 within the selected section. In other words, horizontal axis 32 will represent a time scale that is related specifically to the data graphed within a graph area 46 for which the relative time property is set.

Scroll Position

The scroll position property is associated with the position of a slider 48 within a scroll bar 50, relative to the start of the first section (in scroll units), where the left side of the graph will begin rendering. The scroll units have the same time duration as a pixel on the screen. However, a zero value in scroll units always refers to the first pixel of the first section.

Scroll Maximum

The scroll maximum property is the maximum value that is assignable to the scroll position property.

Metrics

The metrics properties describe dimensions of a graph control icon. Moreover, the metrics properties include the width of a collapsed section or region, as well as the width of a graph area. Other properties involving the dimensions of other graphic related members can be added due to the polymorphic nature of objects such as the graph control object.

Border Pen

The border pen properties define the pen used to render borders 52 around graph areas and the like. Border pen properties include the color and stroke weight of the line or lines used to render a border.

Grid Pen

The grid pen properties define the pen used to render grid 40 overlaying graph area 42. Like the border pen properties, the grid pen properties include the color and strike weight of the lines used to render grid 40. Additionally, the grid pen properties also define the style of the line such as continuous, dotted or dashed.

Selection Mode

The selection mode property is a value that determines the type of data selection enabled. Possible values for the selection mode property include Trace, which is used to select ranges, Region used to select regions and re-dimension them, or Range, which is used to select a scroll unit range.

Selected Range

The SelectedRange property defines the data range in scroll units. If the value is left NULL, no range is selected.

SelectedTrace

The SelectedTrace property is a logical value associated with selecting a trace. If the value is set true, then the associated trace is selected. If the value is left Null or set false, the particular trace associated with the true value is not selected.

SelectedRegion

The SelectedRegion property is a logical value associated with selecting a region. If the value is set true, then the associate region is selected. On the other hand, if the value is set false or is NULL, then the associated region is not selected.

Regions are selected by way of a plurality of region GUI buttons 51 and are adjacent the topmost of graph areas 52. Whenever a user clicks on any one of region GUI buttons 51, that particular region GUI button and the region under it will either collapse or be rendered viewable, depending on the previous logical state represented by the logical value of the SelectedRegion property. In the preferred embodiment, a positive or true logical value will render the selected region viewable, whereas a negative or false logical value will collapse or remove from view the selected region. In their collapsed state, region GUI buttons 51 are reduced to a minimal length. On the other hand, whenever the SelectedRegion logical value is true, region GUI buttons 51 have region boundary markers 53 that aid in identifying selected regions of graph areas 46. The distance between region boundary markers associated with a particular region GUI button is substantially equal to the length of its respective button.

Area Collection:

Turning back to FIG. 2, the Area collection of objects 26 is a public member of the Graph control object 22. The Area collection holds a set of graph area objects. Each graph area object represents the methods and properties associated with each graph area of the control. A Graph Area Object 56 has the following properties:

Height

The height property is an integer value to which the height of a graph area relative to others is given. For example, if all the heights are set to the integer value one, then all graph areas selected will be rendered the same height. If one graph is set to two and the others are set to one, then the one set to two will be twice the height of all the others.

Divisions

The divisions property is an integer that sets the number of vertical divisions 54 to display on the axis and grid.

Collapsed

The collapsed property is a logical value that determines if an associated graph area is collapsed or not. If the collapsed property logic value is true the graph area is collapsed, otherwise it is displayed. Any one of graph areas 46 is selected by way of an associated graph area GUI button 57. Whenever, a user clicks on any one of graph area GUI buttons 57, the associated graph area will either collapse or be rendered viewable depending on the previous logical state represented by the logical value of the collapsed property. In the preferred embodiment, a positive or true logical value will render the selected graph area viewable, whereas a negative or false logical value will collapse or remove from view the selected graph area.

Axis Objects:

There are several axis objects, one is a Left axis object 58 and another is a Right axis object 60. These objects are used by graph areas for rendering their respective axis and by traces for rendering a trace within a graph area. Left axis object 58 and Right axis object 60 each have a Title property that allows a user to give each axis a descriptive title.

Other axis objects fall with the public Axis Label Collection 62. These objects have properties such as a numeric Format property that allows a user to select the proper number format for the numbers associated and presented with each axis. For example, the Format property can be used to fix the decimal of the numbers associated with each axis. Additional properties, such as Max and Min are values that further define each axis. The Max property value sets the top of the axis and the Min property value sets the bottom of the axis. An Axis label object 64 is a public object within Axis Label Collection 62.

Section Collection:

Section collection 24 contains a set of section objects. Each section object in turn contains a trace collection and a region collection. A Section object 66 has the following properties:

Collapsed

The collapsed property is a logical value that determines if an associated section is collapsed or not. If the collapsed property logic value is true the section is collapsed, otherwise it is displayed. Any one of sections 36 is selected by way of an associated section GUI button 57. Whenever, a user clicks on any one of section GUI buttons 57, the associated section will either collapse or be rendered viewable depending on the previous logical state represented by the logical value of the collapsed property. In the preferred embodiment, a positive or true logical value will render the selected section viewable, whereas a negative or false logical value will collapse or remove from view the selected section.

Title

The section Title property is a user definable text description that appears above a section. Preferably, the user can select the font, size and color of the text.

Start Time

The start time property is the actual date and time of the start of a section.

End Time

The end time property is the actual date and time of the end of the section.

Relative Start Time

The actual time for which a time relative to the section start time and end time is set to zero.

Trace Object:

A Trace object collection 68 has a Trace object 70 that contains properties and methods that manage the display of a stream of data. Associated with each trace are a Trace Style object 72 and an Axis object 74. In addition, the following properties are associated with a trace:

Graph Area

The graph area property is associated with the graph area selected to render a trace. It is preferred that this property be assigned one of the areas within the Area Collection.

Selected

The property known as "Selected" is a Boolean value that indicates whether or not to render a trace within the section as a selected trace.

Tag

The Tag property is a general-purpose value, which stores application-specific information associated with the trace.

Axis

The Axis property is a value used to render a trace within a graph area. Preferably, the axis property is one of a number of axis objects associated with an area.

Title

The title property stores a string of alphanumeric characters that can be used to title traces of a graph legend.

Trace Style

The Trace Style property is a value assigned to an instance of a trace style object. This value stores information related to the rendering of a trace. It is preferred that the trace style instance be shared among multiple traces.

Trace Style Object:

The Trace Style Object 72 contains the following properties:

Pen

The pen property is a value used to draw an unselected trace.

Selected Pen

The selected pen property is a value used to draw a selected trace.

Point Marker

The Point Marker Property is a value that determines the shape of a data point displayed within a trace. For example, the trace point property may specify, but is not limited to, a filled or unfilled triangle, circle or rectangle. It is also possible to assign a value to this property that will result in no marker being visible.

Join Type

The Join Type Property is a value that indicts whether or not to join the data points that make up a trace, and if so, how to do it, either with straight line, cubic splines, or with horizontal and vertical pairs.

Region Object:

A Region Collection 76 has a Region Object 78 that provides information about additional folds in the graph. The following are properties associated with Region Object 78:

Collapsed

The Collapsed property indicates whether or not a region is collapsed.

Start Time

The starting time property is a value representing a start time and date for a region.

The end time is automatically used as the start of the region that directly follows.

Background Color

The background color property is a color value that determines the background color applied to a graph area within an associated region.

Title

The title property is an alphanumeric string making up the title of an associated region.

Internal Structures:

The internal structures are used to manage the information associated with a specific view of the data. That is, these structures are used internally for the current rendering, and are used to make subsequent renderings more efficient and for making the use of computer input devices, such as a computer mouse more efficient.

Time Span Object:

A Time Span Object 80 stores information about a region of the graph along the horizontal or time axis. For example, in FIG. 2, there are eight time spans. Each Time Span object manages the visible regions. A Trace Segment Collection 82 and a Time Axis Label Collection 84 are associated with each instance of Time Span object 80. A Time Axis Label object 86 is a member of Time Axis Label collection 84. Trace Segment Collection 82 includes a Trace Segment Object 88, a Data Point Collection 90, and a Data Point Object 92. The following properties are relevant to Time Span object 80:

Start Scroll Position

The start scroll position property is a value that determines the starting scroll position of a time span scroll indicator.

End Scroll Position

The end scroll position property is a value that determines the ending scroll position of a time span scroll indicator.

Collapsed

The collapsed property is a logical value that determines if an associated Time Span is collapsed or not. If the collapsed property logic value is true the Time Span is collapsed, otherwise it is displayed.

Time Axis Label Objects:

An Axis Label Collection 82 has a time Axis Label Object 84 that contains properties and methods that make rendering the horizontal or time axis more efficient.

Time

The time property is a date and time property value for a label associated with the horizontal axis.

Relative Time

The relative time property is a section-relative time value of an associated label.

X-Coordinate

The X-coordinate property is a value used to determine the tick interval of the horizontal axis.

Visible

The visible property is a logical value that determines the visibility of a label. An associated label is drawn, if the visible property is set true, otherwise the label is hidden. For example, the visible property value would be automatically set to false if the label would overlap with an adjacent label.

Size

The size property is a value that determines the dimensions of a rendered label in pixels.

Text

The text property is a string of alphanumeric characters that become the text of the label when rendered.

In operation, rendering of a graph begins by erasing all graph background areas and drawing a border around the graph areas. Next, in no particular order, scroll bar 50 and section/region map 59 are rendered along with at least one marker 61, as well as vertical axis 55 and border of each graph area 52. The horizontal or time axis 32 is also rendered before, during or after the rendering of the previous items.

The Scroll Position and Scroll Maximum properties of Graph Control 22 have values measured in units that are similar to display pixel units. For the purposes of this description, these units are called "scroll units". A scroll unit represents the same display distance as a pixel on the display. Scroll units are necessary to ensure that the scrollbar positions each graph in a fashion that is intuitive to the user. Essentially, the image of the graph visible to the user is a small portion of an entire graph range. In other words, the graph visually represents only a portion of the data available.

Using scroll units, collapsed regions and sections can be maintained appropriately with the scrollbar. Internal to each region and section is information that tracks how many scroll units it currently occupies. The sum of all these scroll units determines the Scroll Maximum value.

The properties of the section and region objects have a Start Time property, and the section has an End Time property, but neither have a property that specifically indicates their width in scroll units. A collapsed section or region will occupy a fixed number of scroll units. This number is part of the metrics exposed on the graph control.

The VisibleDuration property determines the time that each pixel of the display monitor represents. Also, a pixel also represents the amount of time to associate with a single scroll unit since a pixel has the same display distance as a scroll unit.

Moreover, since the amount of time assigned to a scroll unit is known, the amount of scroll units a single section would occupy if all the regions were expanded can be calculated. Collapsed regions are a fixed number of scroll units, so calculating scroll unit positions of every section and region within the section collection is a matter of iterating through each section and each region in each section.

To plot data on this graph control, it is useful to break the plot up into a series of smaller graphs. Each of these smaller graphs is formed at the intersection of each graph area and time span. By forming them this way, the smaller graphs will have a continuous X range and Y range, and as a result, the programmer can use traditional graph plotting techniques to draw the trace segments on each of these smaller graphs.

A note about this architecture: Each trace has a vertical axis object associated with it. This axis object provides the trace-to-pixel coordinate translation information for the Y coordinate. Since each trace can have a separate axis object, it is not necessary to implement specific trace scaling properties (so that traces of different magnitudes may be overlaid).

To render the control, the programmer should perform the following tasks, though not necessarily in this order:
  i) Draw the Y axis or axes for each Graph Area
  ii) Render the Time Axis for each Time Span
  iii) Draw the collapse buttons and controls
  iv) Render each Time Span for each Graph Area For each Time Span in each Graph Area, the programmer should perform the following tasks, though not necessarily in the following order:
  i) Fill with the Region Background Color
  ii) Draw the grid using the Grid Pen
  iii) Plot the data associated with each Trace Segment using traditional graph plotting techniques.

Certain modifications will occur to those skilled in the art upon a reading of the foregoing description. It should be understood that all such modifications and improvements have been deleted herein for the sake of conciseness and readability, but are properly within the scope of the following claims.

What is claimed is:

1. A method of displaying a scientific research data set on an electronic display, said method comprising:
  a) generating at least one data graphing area having a plurality of sections on the electronic display;
  b) plotting within said at least one data graphing area plurality of sections a plurality of data points representing at least a portion of said scientific research data set;
  c) generating a graphical user interface control section button for each of said plurality of sections for selectively rendering in or removing from said at least one graphing area plurality of sections at least one selectable range of said plurality of data points;
  d) receiving input by way of said graphical user interface control section buttons, said selectable range of said plurality of data points along with an indicator of whether or not to render in or remove from said at least one graphing area one or more of said plurality of sections each of which having a selectable range of said plurality of data points; and e) dynamically rendering in or removing from said at least one graphing area selected ranges of the plurality of data points in response to the input received by way of said graphical user interface control section buttons.

2. The method of claim 1, wherein said scientific research data set includes data mixed with noise.

3. The method of claim 2, wherein said noise is selected for removal from said at least one graphing area by way of said graphical user interface control section buttons.

4. The method of claim 1, wherein said graphical user interface control section buttons each have a length and width, wherein said length is adjustable to select more or less of a portion of said at least one graphing area.

5. The method of claim 4, wherein said graphical user interface control section buttons each include an associated logical value for determining whether or not to render said section in said at least one graphing area or to remove said section from said at least one graphing area.

6. The method of claim 4, further including a step of generating a plurality of regions within said plurality of sections, each of said regions having a graphical user interface control region button with a length and width, wherein said length is adjustable to select more or less of a portion of an associated region.

7. The method of claim 6, wherein said graphical user interface control region button includes a logical value for determining whether or not to render a region in an associated section.

8. The method of claim 1, further including a step of providing a horizontal axis for said at least one graphing area.

9. The method of claim 8, wherein said horizontal axis is common to two or more graphing areas.

10. The method of claim 8, wherein said horizontal axis is a time axis.

11. A system for graphing user selectable ranges of data points representing at least a portion of a scientific research data set, said system comprising:

a) a computerized device having an electronic display for displaying said user selectable ranges of data points, an input device for receiving user input, a digital processor for processing data and a memory for storing computer instructions and data;

b) a set of graphical user interface instructions executable by said digital processor and stored within said memory to direct said computer to:

i) generate at least one data graphing area having a plurality of sections on said electronic display;

ii) graph within said at least one data graphing area plurality of sections at least one selectable range of data points representing at least a portion of said scientific research data set;

iii) generate a graphical user interface control section button for each of said plurality of sections for selectively rendering or removing from view said at least one selectable range of data points;

iv) receive input by way of said graphical user interface control section buttons said at least one selectable range of said plurality of data points along with an indicator of whether or not to render or remove from view said at least one selectable range of data points; and v) render or remove from view selected ranges of said at least one selectable range of data points in response to the input received by way of said at least one graphical user interface control section buttons.

12. The system of claim 11, wherein said graphical user interface control section buttons each have a length and width, wherein said length is adjustable to select more or less of a portion of said at least one graphing area.

13. The system of claim 12, wherein said graphical user interface control section buttons each include an associated logical value for determining whether or not to render said section in said at least one graphing area or to remove said section from said at least one graphing area.

14. The system of claim 13, further including a set of graphical user interface instructions to generate a plurality of regions within said plurality of sections, each of said regions having a graphical user interface control region button with a length and width, wherein said length is adjustable to select more or less of a portion of an associated region.

15. The system of claim 14, wherein said graphical user interface control region button includes a logical value for determining whether or not to render a region in an associated section.

16. A graphical user interface for managing the display of a scientific research data set, said graphical user interface comprising:

a) a graph control object for generating at least one data graphing area on said electronic display;

b) a section object for generating a plurality of sections within said at least one data graphing area;

c) a region object for generating a plurality of regions within any one of said plurality of sections;

d) a data plotting object for plotting data points within said sections and regions of said at least one graphing area, said data points being from said scientific research data set;

e) a vertical axis object for generating a vertical axis scaled appropriately for said scientific research data;

f) a span object for storing information about the horizontal span of data points plotting by said data plotting object; and g) a horizontal axis object for generating a horizontal axis scaled according to said information stored by said span object.

17. The graphical user interface of claim 16, wherein said section object includes a logical value that determines whether or not a section is rendered within said at least one graphing area or removed from said at least one graphing area.

18. The graphical user interface of claim 17, wherein said section object includes start, and end time properties that set the dates and times of a starting point and ending point of a rendered section.

19. The graphical user interface of claim 16, wherein said region object includes a logical value that determines whether or not a region is rendered within a rendered section or removed from said rendered section.

20. The graphical user interface of claim 16, further including a horizontal scroll bar for scrolling through said scientific data set.

21. The graphical user interface of claim 20, further including a map area having at least one marker representative of where in said scientific data set any rendered data points come from.

* * * * *

UNITED STATES PATENT AND TRADEMARK OFFICE
CERTIFICATE OF CORRECTION

PATENT NO. : 7,233,333 B2 Page 1 of 1
APPLICATION NO. : 10/995584
DATED : June 19, 2007
INVENTOR(S) : Joseph Lomask It is certified that error appears in the above-identified patent and that said Letters Patent is hereby corrected as shown below:

On the title page, Item [73] should read:

ASSIGNEE: BUXCO ELECTRONICS, INC., SHARON, CT (US)

Signed and Sealed this

Seventh Day of August, 2007

JON W. DUDAS
*Director of the United States Patent and Trademark Office*